(12) United States Patent
Hasegawa

(10) Patent No.: US 7,268,448 B2
(45) Date of Patent: Sep. 11, 2007

(54) PLURAL OUTPUT SWITCHING REGULATOR WITH PHASE COMPARISON AND DELAY MEANS

(75) Inventor: Morihito Hasegawa, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 2 days.

(21) Appl. No.: 11/369,003

(22) Filed: Mar. 7, 2006

(65) Prior Publication Data

US 2007/0139023 A1    Jun. 21, 2007

(30) Foreign Application Priority Data

Dec. 20, 2005    (JP) .............................. 2005-367132

(51) Int. Cl.
*H02J 1/00* (2006.01)
(52) U.S. Cl. .......................................... 307/31; 307/39
(58) Field of Classification Search ................ 307/31, 307/32, 11, 39
See application file for complete search history.

(56) References Cited

U.S. PATENT DOCUMENTS 4,430,576 A * 2/1984 Fowler ......................... 307/39

FOREIGN PATENT DOCUMENTS

JP    2005-012868    1/2005
JP    2005-518775    6/2005

* cited by examiner

*Primary Examiner*—Shawn Riley
(74) *Attorney, Agent, or Firm*—Arent Fox LLP

(57) ABSTRACT

Disclosed are a control circuit and control method for a comparator-controlled type DC-DC converter that can prevent the generation of audible noise due to the difference between relevant switching frequencies and prevent the increase in the input power source ripple voltage. A phase comparator FC outputs a compared-result signal CONT in correspondence with the phase difference between an output signal FP2 and a delay signal FR1. A delay circuit DLY2 performs a feedback control for adjusting the amount of retardation time in correspondence with the compared-result signal CONT. And, the delay circuit DLY2 outputs a delay signal FR2 after the passage of a prescribed amount of retardation time from the time when the falling edge of an output signal SQB2 has been input. At a time t16 that is after the passage of a prescribed amount of time, there is obtained a time delay DT2$b$ that causes the period TT1 of the delay signal FR1 and the period TT2$b$ of the output signal FP2 to coincide with each other and that makes zero the phase difference between the delay signal FR1 and the output signal FP2.

7 Claims, 9 Drawing Sheets

CIRCUIT DIAGRAM OF DC-DC CONVERTERS 1 AND 2

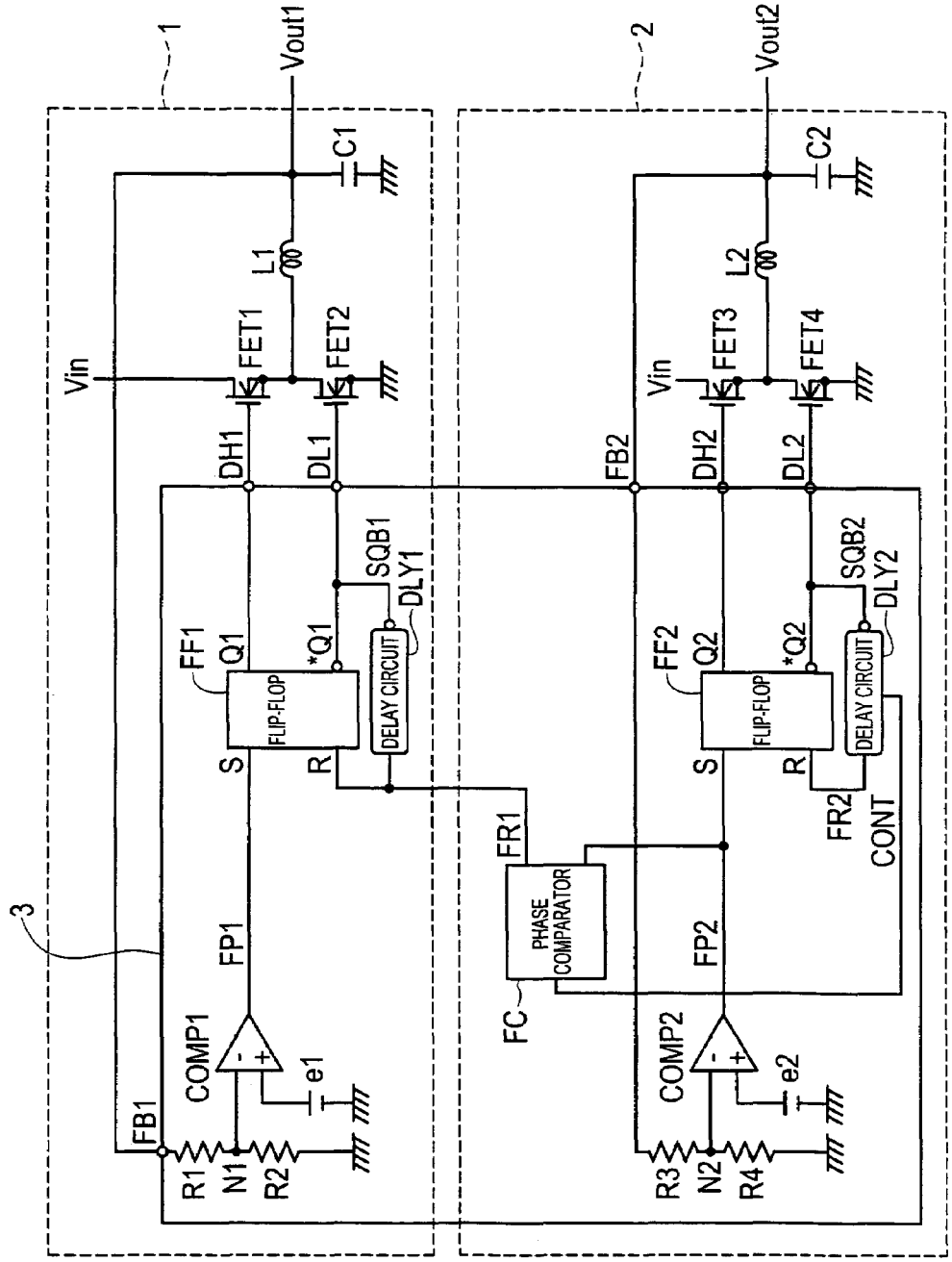
FIG. 1 CIRCUIT DIAGRAM OF DC-DC CONVERTERS 1 AND 2

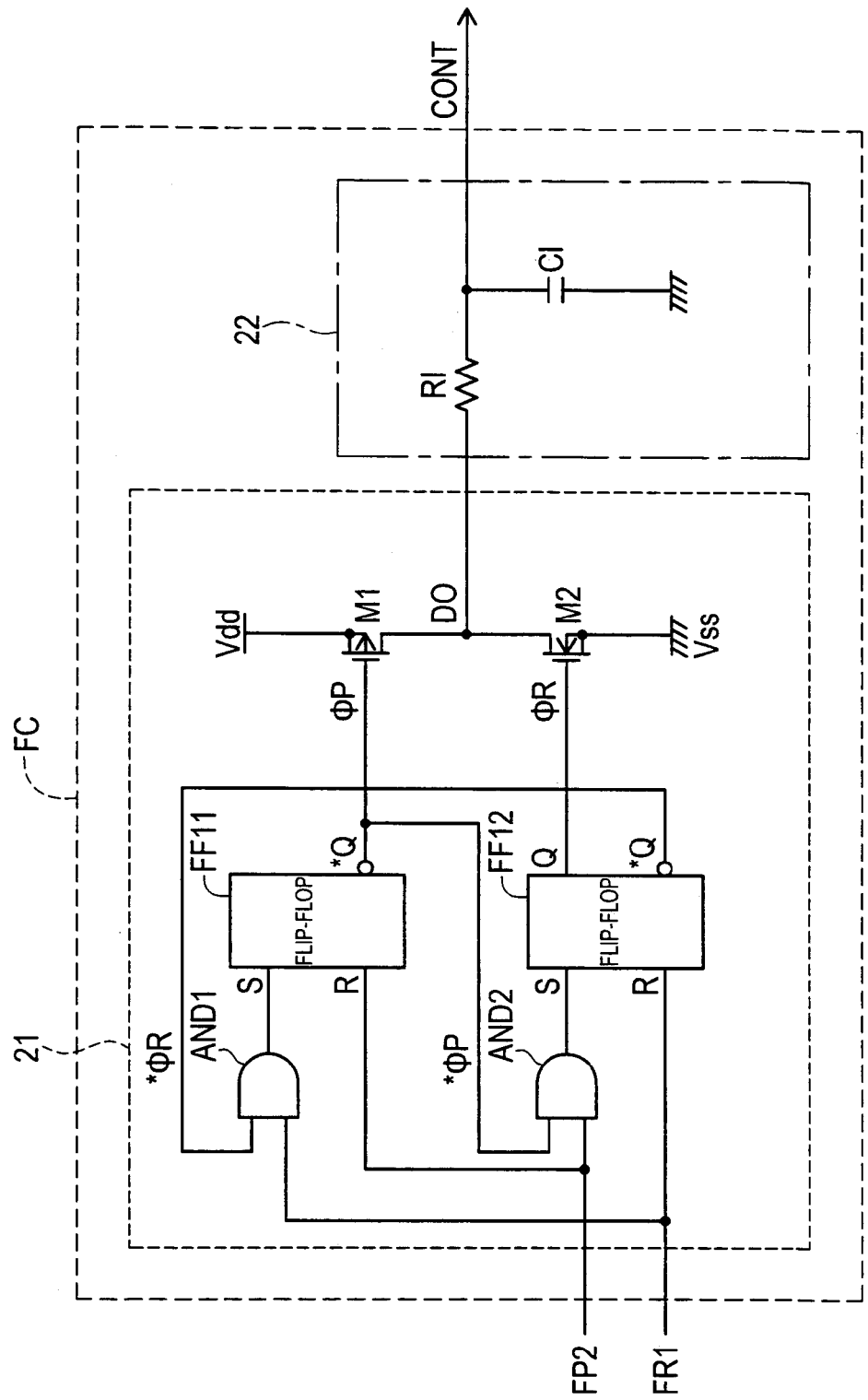
FIG. 2 CIRCUIT DIAGRAM OF PHASE COMPARATOR FC

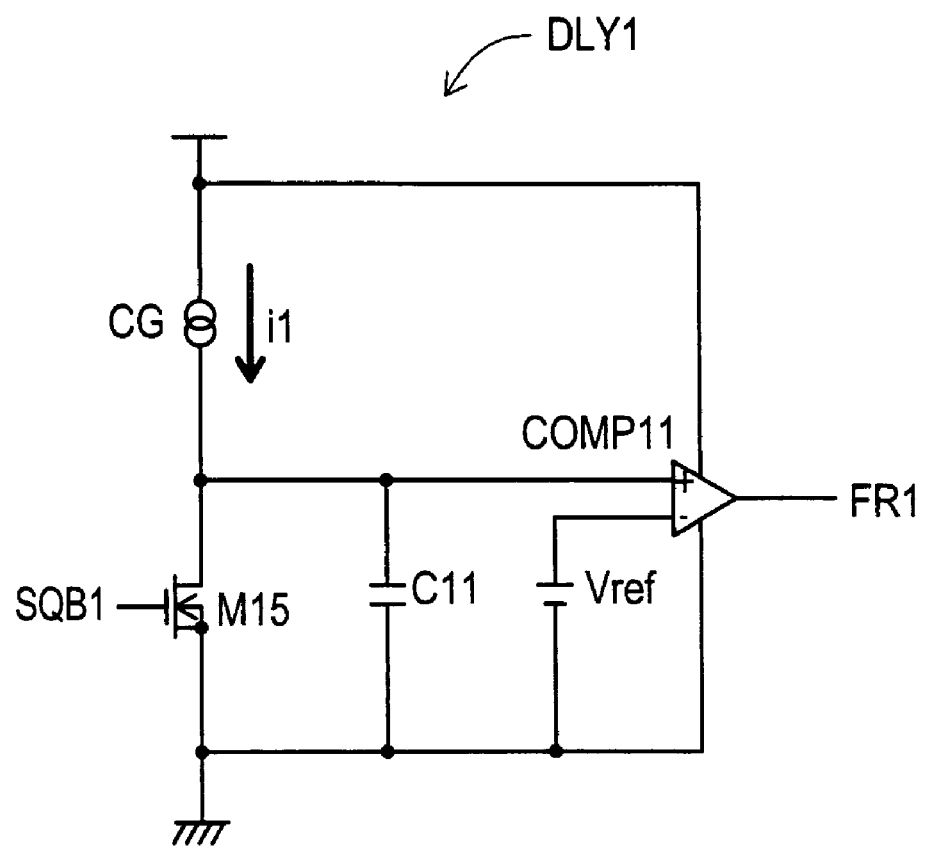
FIG. 3 CIRCUIT DIAGRAM OF DELAY CIRCUIT DLY1

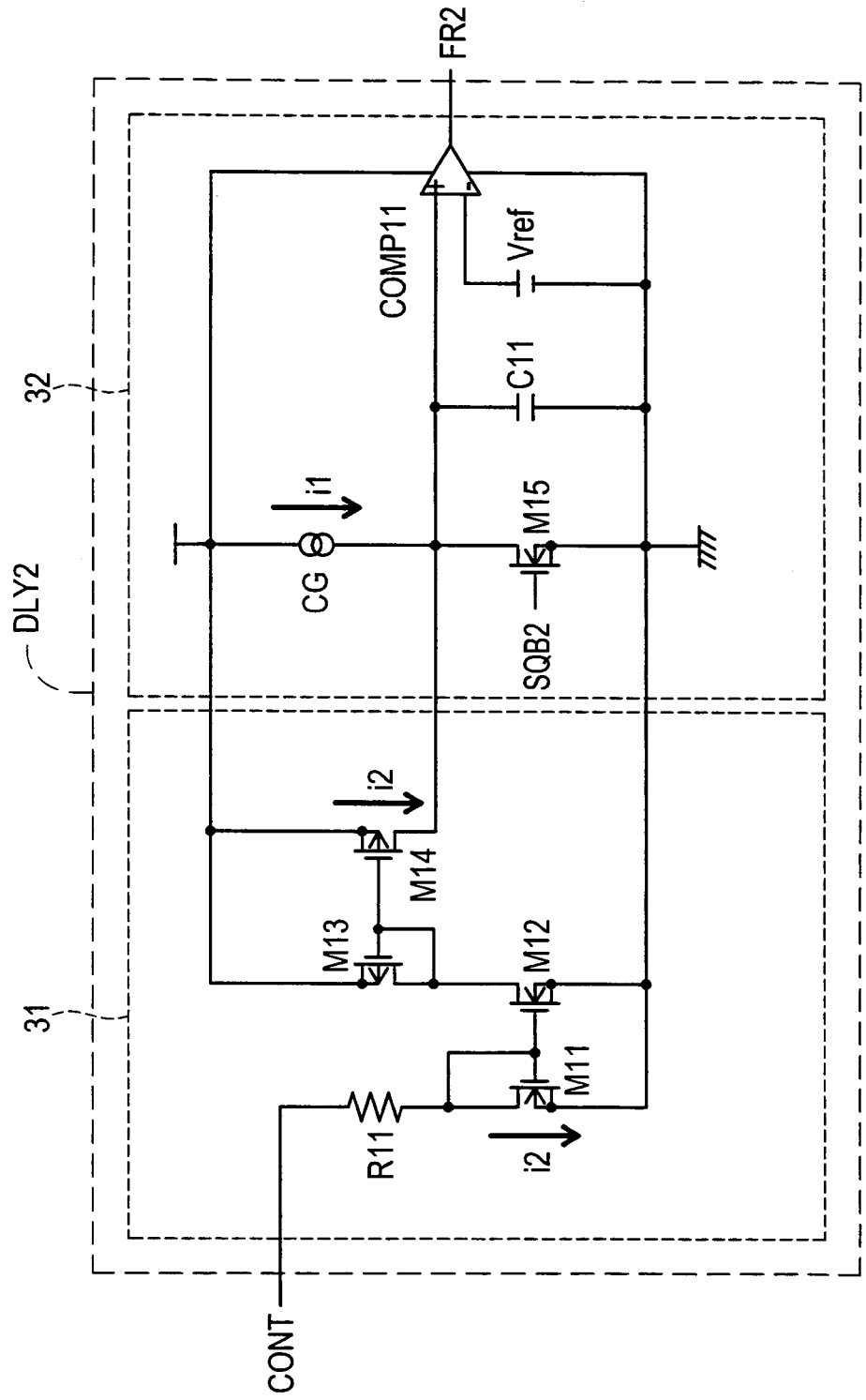
FIG. 4  CIRCUIT DIAGRAM OF DELAY CIRCUIT DLY2

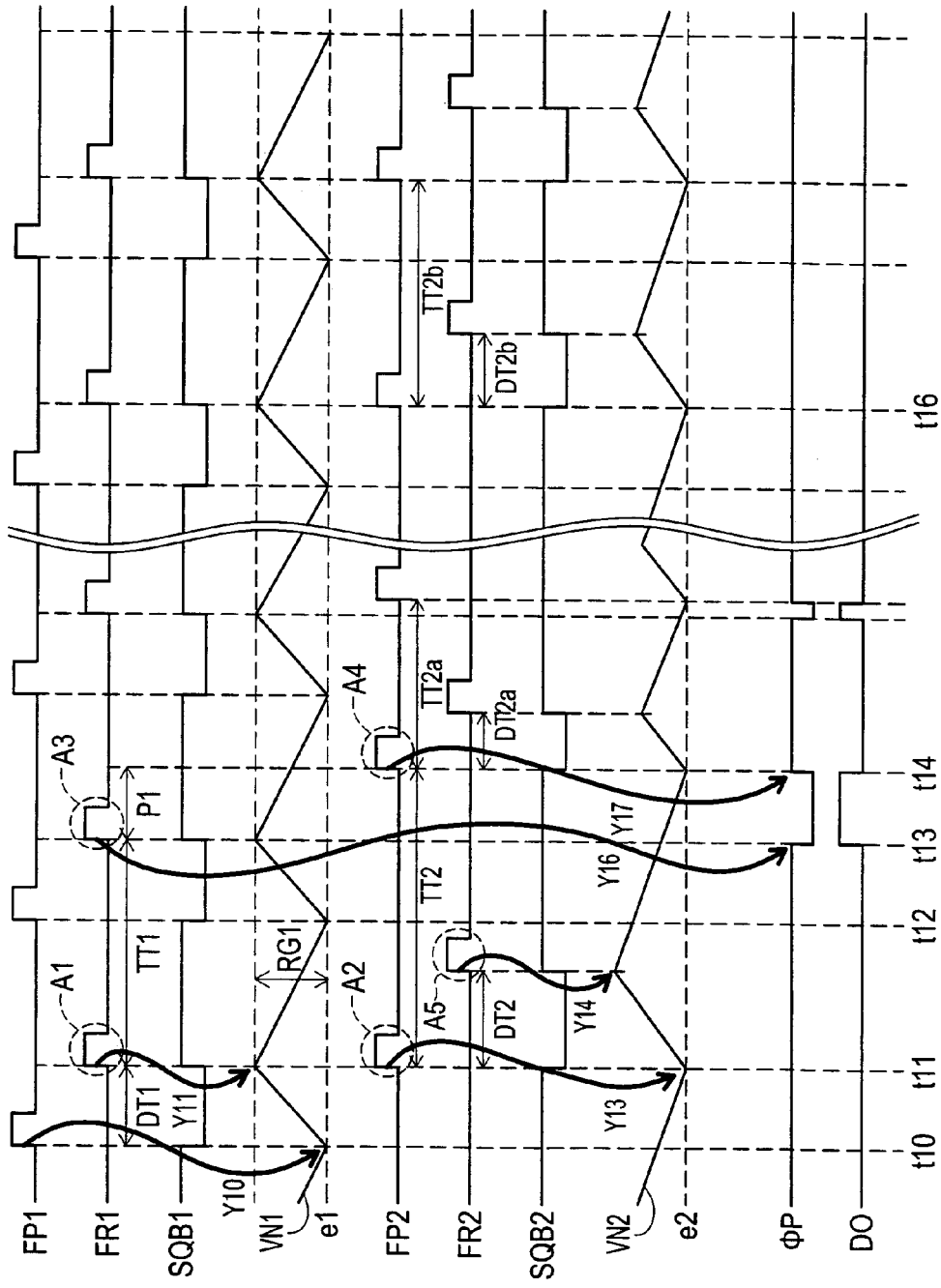
FIG. 5 TIMING CHART (FIRST ONE) OF DC-DC CONVERTERS 1 AND 2

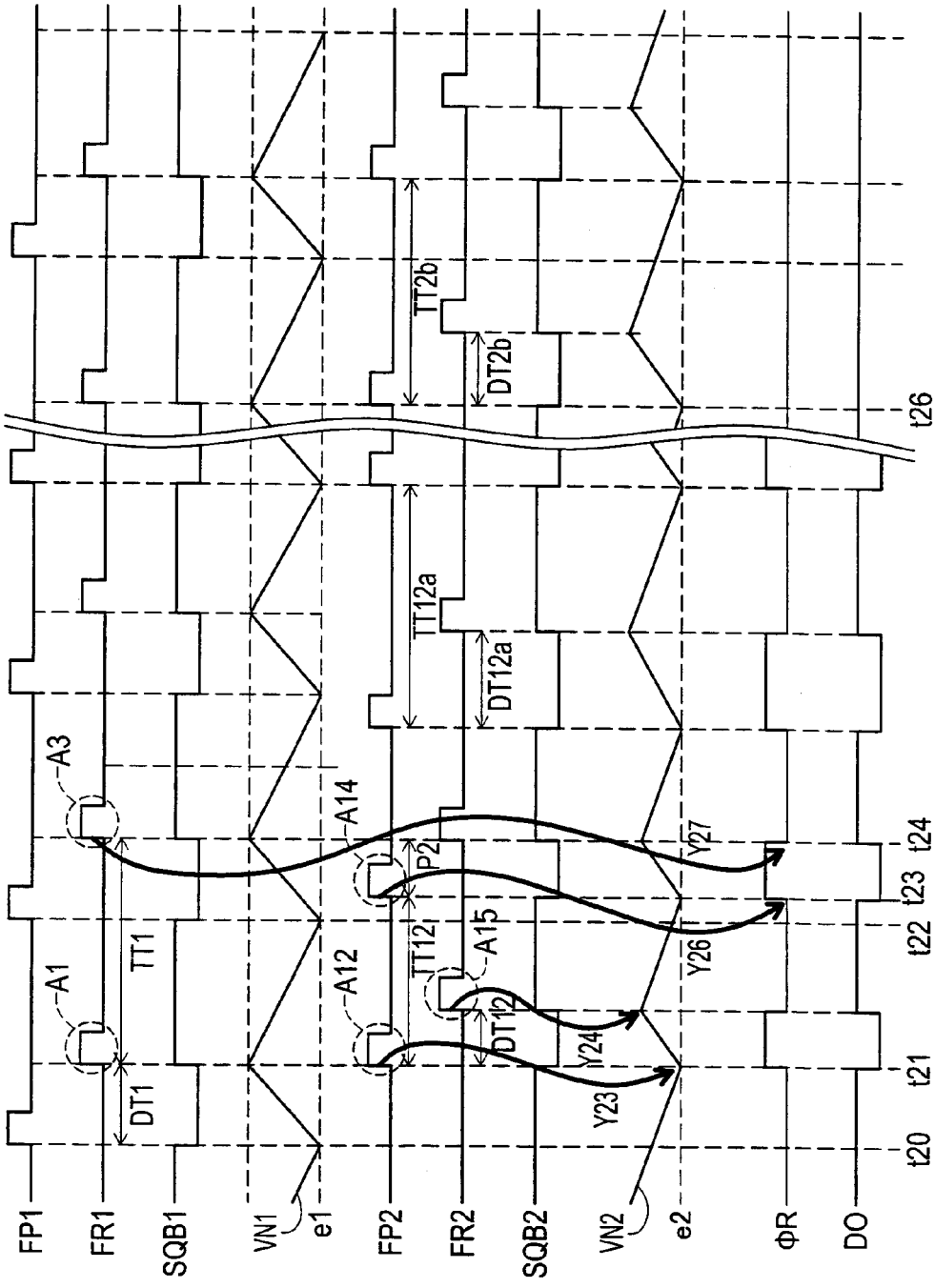
FIG. 6 TIMING CHART (SECOND ONE) OF DC-DC CONVERTERS 1 AND 2

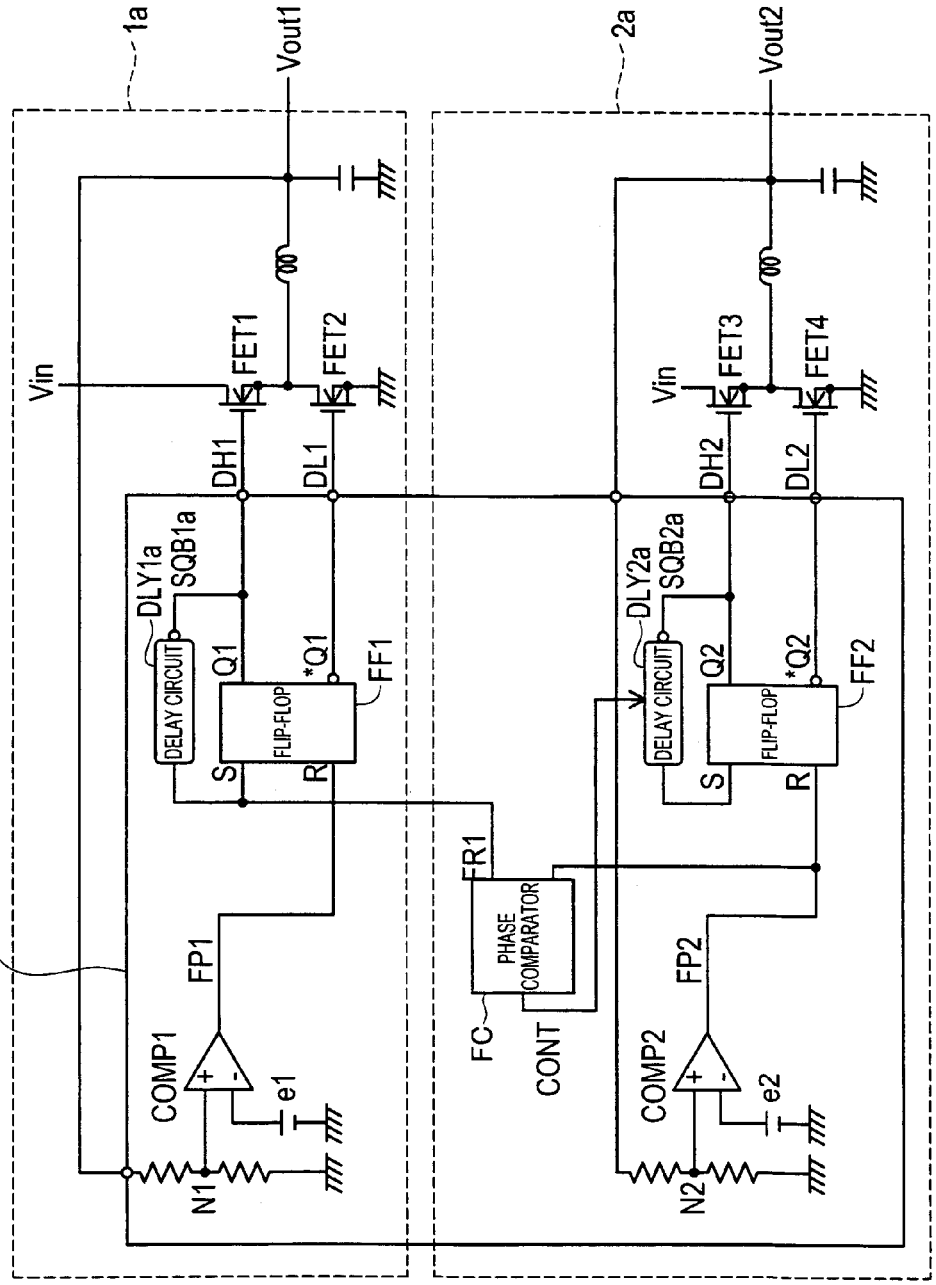
FIG. 7 CIRCUIT DIAGRAM OF FIXED-"OFF"-TIME-DURATION TYPE DC-DC CONVERTERS 1a AND 2a

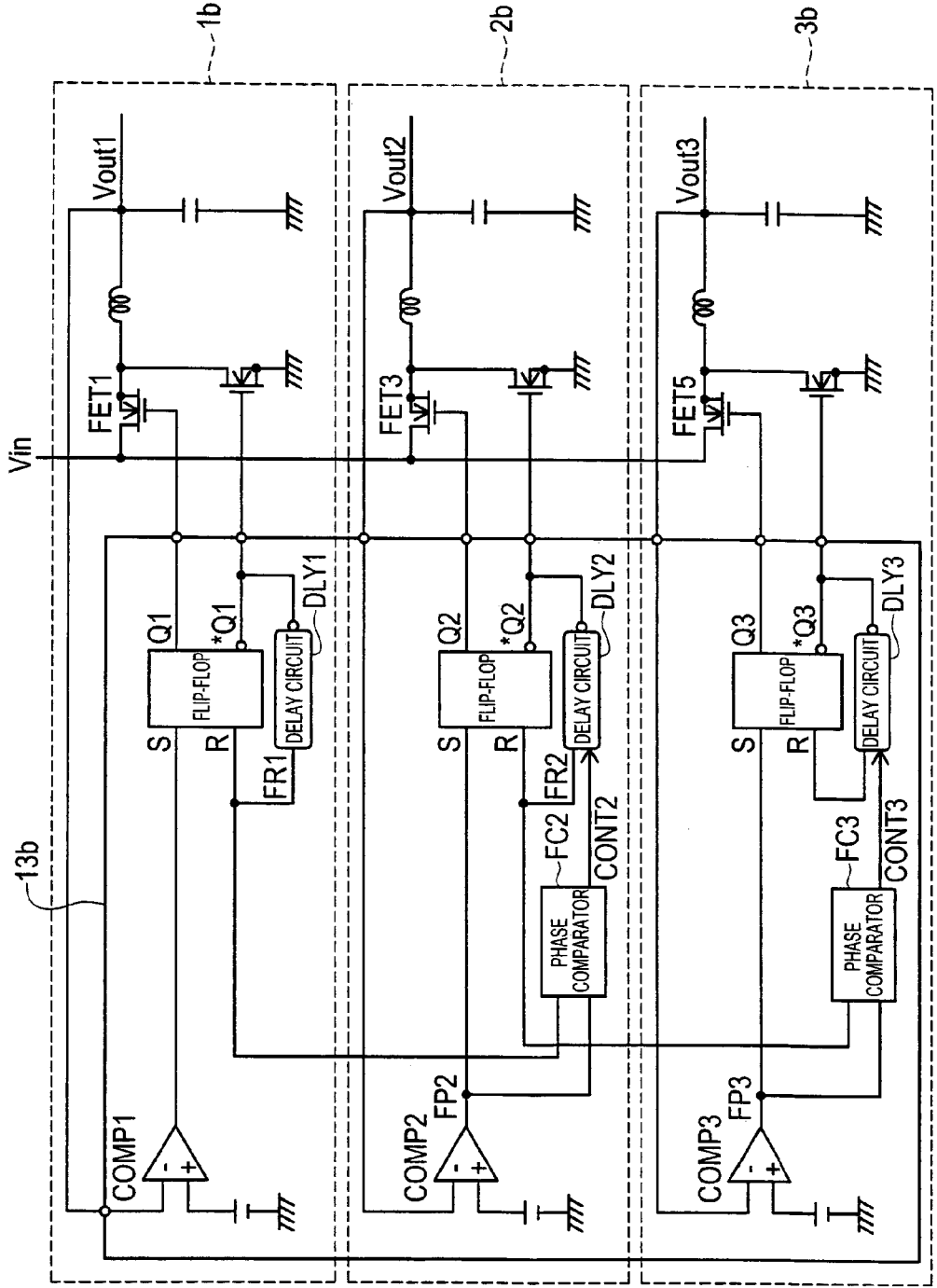
FIG. 8 CIRCUIT DIAGRAM OF DC-DC CONVERTERS 1a TO 3a

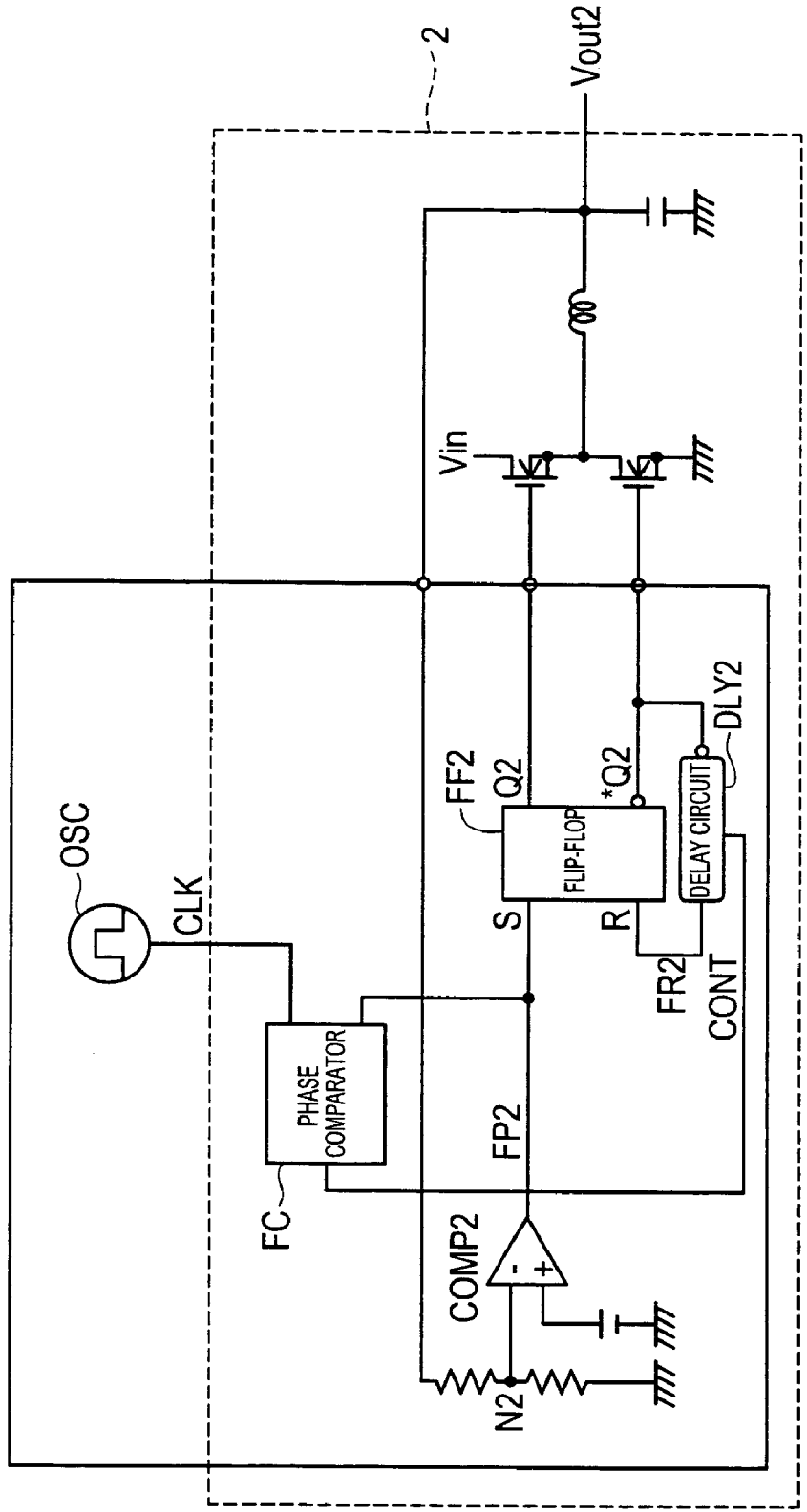
FIG. 9 CIRCUIT DIAGRAM OF DC-DC CONVERTER 2 IN CASE WHERE OSCILLATOR IS USED

PLURAL OUTPUT SWITCHING REGULATOR WITH PHASE COMPARISON AND DELAY MEANS

CROSS-REFERENCE TO RELATED APPLICATIONS

This application is based upon and claims the benefit of priority from each of the prior Japanese Patent Application No. 2005-367132 filed on Dec. 20, 2005, the entire contents of which are incorporated herein by reference.

BACKGROUND OF THE INVENTION

1. Field of the Invention

The present invention relates to a control circuit and control method for comparator-controlled type DC-DC converters and, more particularly, to a switching control method of the main switching transistors and a control method of operating frequencies.

2. Description of the Related Art

There is a comparator-controlled PFM type DC-DC converter, in which, as a control system capable of making a high-speed response to a rapid change in the level of load, the output voltage of the DC-DC converter is compared with a reference voltage to thereby make on/off control of the main switching transistors.

Incidentally, as the above-described related art, there are disclosed Japanese unexamined patent publication No. 2005-518775 and Japanese unexamined patent publication No. 2005-12868.

SUMMARY OF THE INVENTION

However, in the comparator-controlled PFM type DC-DC converter, the oscillation frequency fluctuates depending on the time constant of a relevant circuit as well as the level of a relevant load. Accordingly, there is a possibility that when operating a plurality of DC-DC converters, owing to the difference between the operating frequencies, audible noise will occur due to the difference between the switching frequencies. Therefore, this technique involves a problem. Also, when the operating frequency fluctuates with the result that the simultaneous on/off operations of the main switching transistors happen, the ripple voltage of the input power source increases. This also causes a problem. These problems are phenomena that are unpreferable to the system.

The present invention has been made for the purpose of solving at least one of the problems involved in the above-described background art and has an object to provide a DC-DC converter control circuit and a DC-DC converter control method, each of which enables preventing the occurrence of audible noise due to the differences between the switching frequencies, as well as preventing the increase in the input power source ripple voltage due to the simultaneous on/off operations of the main switching transistors.

To achieve the above objection, there is provided a DC-DC converter control circuit comprising: a first comparator that compares an output voltage and a first reference voltage and that detects a case where the output voltage crosses the first reference voltage to output a detection signal; a flip-flop that controls a main switching transistor and that according to the output signal transits from a first state to a second state; a phase comparator that detects the phase difference between a phase reference signal input from outside and the detection signal and outputs a phase difference signal corresponding to the phase difference; and, a delay circuit that is connected between an output and input of the flip-flop circuit and to which there is input the phase difference signal, whereby the delay circuit, in a case where the phase of the detection signal is more advanced than the phase of the phase reference signal, after having imparted an amount of retardation time that has been increased correspondingly to the amount of phase advanced to a transition signal input from the flip-flop at the time of the flip-flop's transiting from the first state to the second state, outputs the transition signal to which the amount of the retardation time is imparted, to the flip-flop; and the delay circuit, in a case where the phase of the detection signal is more retarded than the phase of the phase reference signal, after having imparted the amount of retardation time decreased correspondingly to the amount of phase retarded to the transition signal, outputs the transition signal to which the amount of the retardation time is imparted, to the flip-flop, whereby the flip-flop, correspondingly to that the transition signal to which the amount of retardation time has been imparted is input, transits from the second state to the first state.

A first comparator detects the operation where the output voltage has come across the first reference voltage to output a detection signal.

There are two cases, in one of which there is detected the timing at which the output voltage goes lower than the first reference voltage and in the other of which there is detected the timing at which the output voltage goes higher than the first reference voltage. The flip-flop circuit performs switching control with respect to the main switching transistors according to the detection signal. The flip-f lop circuit transits from a first state to a second state according to the detection signal. The phase comparator detects a phase difference between the phase reference signal input from the outside and the detection signal and outputs a phase difference signal corresponding to this phase difference. Here, the phase reference signal may, for example, be a control signal for the main switch transistor of another DC-DC converter, or a clock signal that is output from an oscillator. Since the DC-DC converter operates at an oscillation frequency corresponding to the time constant of the circuit and the level of the load, the detection signal becomes a signal that has a prescribed value of period. The delay circuit is connected between the output and the input of the flip-flop, whereby a phase difference signal is input.

In a case where the phase of the detection signal is the one that detects the timing at which the output voltage becomes lower than the first reference voltage, if the flip-flop is in a first state, the main switching transistor is made non-conductive. If the flip-flop is in a second state, the main switching transistor is made conductive. And a so-called fixed on-time duration type comparator-controlled type DC-DC converter is constructed. On the other hand, in a case where the detection signal is the one that detects the timing at which the output voltage becomes higher than the first reference voltage, if the flip-flop is in the first state, the main switching transistor is made conductive. If the flip-flop is in the second state, the main switching transistor is made non-conductive. And a so-called fixed off-time duration type comparator-controlled type DC-DC converter is constructed.

In a case where the detection signal is advanced more than the phase reference signal, it is determined that the period of the detection signal is shorter than the period of the phase reference signal. Accordingly, the delay circuit, after having imparted an amount of retardation time that has been increased correspondingly to the amount of phase advanced to a transition signal input from the flip-flop at the time of the flip-flop's transiting from the first state to the second state, outputs the transition signal to which the amount of the retardation time is imparted, to the flip-flop. The flip-flop transits from the second state to the first state corresponding to that the transition signal which the amount of retardation time has been added thereto is input. Therefore, when the amount of retardation time is increased, the time duration in which the flip-flop is kept in the second state is kept long. In case of the fixed on-time duration type DC-DC converter, when the second state is prolonged, because the time duration in which the main switching transistor is being conductive becomes long, the amount of increase in the output voltage becomes large. Then, when the main switching transistor has been made non-conductive, the amount of time during which the output voltage becomes lowered to the level of the first reference voltage becomes long. Therefore, the period of the detection signal becomes increased. Also, similarly, in case of the fixed off-time duration type DC-DC converter, when the second state is prolonged, because the time duration in which the main switching transistor is kept non-conductive is increased, the amount of decrease in the output voltage becomes large. If becoming so, since when the main switching transistor has been made conductive the time duration in which the output voltage increases to the level of the first reference voltage becomes long, the period of the detection signal becomes long.

On the other hand, in a case where the detection signal is retarded more than the phase reference signal, it is determined that the period of the detection signal is longer than that of the phase reference signal. Accordingly, the delay circuit, after an amount of retardation time that has been decreased correspondingly to the amount of phase delayed is added to the transition signal, outputs the transition signal to the flip-flop. If the amount of retardation time is decreased, the time duration in which the flip-flop is in the second state is shortened. In case of the fixed on-time duration type DC-DC converter, if the second state becomes short, the amount of increase in the output voltage lesses. For this reason, the period of the detection signal becomes short. Also, in case of the fixed off-time duration type DC-DC converter, if the second state is short, the amount of decrease in the output voltage lessens. For this reason, the period of the detection signal becomes short.

As a result of the above-described operation, the feedback control for adjusting the period of the detection signal is performed according to the phase difference between the detection signal and the phase reference signal. As a result of this, it is possible to cause a coincidence of the period of the phase reference signal with the period of the detection signal and, in addition, to obtain an amount of retardation time that makes the phase difference between the phase reference signal and the detection signal zero.

As a result of this, it becomes possible to control so that the oscillation frequency of the DC-DC converter may coincide with the frequency of the phase reference signal. Accordingly, it becomes possible to prevent audible noise from occurring due to the difference between the frequency of the phase reference signal and the oscillation frequency of the DC-DC converter. Also, by suitably setting the frequency of the phase reference signal, it becomes possible to control the oscillation frequency of the DC-DC converter to a prescribed value of frequency.

Also, as a result of this, it becomes possible to achieve a synchronization of the detection signal and the phase reference signal. Accordingly, for example, in a case where performing switching control of separate DC-DC converters through the use of the phase reference signal and the detection signal, since it is possible to prevent the occurrence of the simultaneous "on"/"off" operations of the main switching transistors, it is possible to prevent the increase in the input power source ripple voltage.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a circuit diagram of DC-DC converters 1 and 2;
FIG. 2 is a circuit diagram of a phase comparator FC;
FIG. 3 is a circuit diagram of a delay circuit DLY1;
FIG. 4 is a circuit diagram of a delay circuit DLY2;
FIG. 5 is a timing chart (a first one) of DC-DC converters 1 and 2;
FIG. 6 is a timing chart (a second one) of the DC-DC converters 1 and 2;
FIG. 7 is a circuit diagram of a fixed-"off"-time-duration type DC-DC converters 1a and 2a;
FIG. 8 is a circuit diagram of the DC-DC converters 1a to 3a; and
FIG. 9 is a circuit diagram of the DC-DC converter 2 in a case where an oscillator is used.

DETAILED DESCRIPTION OF THE PREFERRED EMBODIMENTS

FIG. 1 is a circuit diagram of comparator type DC-DC converters 1 and 2 according to the present invention. The DC-DC converters 1 and 2 have a control part 3 that is common to each converter. First, the construction of the DC-DC converter 1 will be explained. In FIG. 1, to an input terminal of a transistor FET 1 that is a switching element, there is connected an input voltage Vin, and, to an output terminal of the transistor FET 1, there is connected an input terminal of a choke coil L1. From an output terminal of the choke coil L1, there is output an output voltage Vout1. Also, to a control terminal of the transistor FET1, there is connected an output terminal DH1 of the control part 3. An input terminal of a transistor FET2 which is a synchronous commutation switch circuit is earthed, and an output terminal thereof is connected to the input terminal of the choke coil L1. Also, to the control terminal of the transistor FET2 there is connected an output terminal DL1 of the control part 3. Between the output terminal of the choke coil L1 and the ground, there is connected a smoothing capacitor C1. The output terminal of the choke coil L1 is connected to an input terminal FB1 of the control part 3.

In the control part 3, between the input terminal FB1 and the ground, there are connected in series via a node N1 a resistive element R1 and R2. To an inverted input terminal of a voltage comparator COMP1 there is connected the node N1, and to a non-inverted input terminal thereof is connected a reference voltage e1. An output signal FP1 of the voltage comparator COMP1 is input to a set input terminal S of a flip-flop FF1. A non-inverted output terminal Q1 of the flip-flop FF1 is connected, via the output terminal DH1 of the control part 3, to the main switching transistor FET1. Also, an inverted output terminal *Q1 is connected to the output terminal DL1 and is connected to a reset input terminal R of the flip-flop FF1 via a delay circuit DLY1. To the delay circuit DLY1 there is input an output signal SQB1, and, from the delay circuit DLY1, a retardation signal FR1 is output.

Also, the construction of the DC-DC converter 2 will be explained below. The DC-DC converter 2 is equipped with a phase comparator FC. To one of the input terminals of the phase comparator FC, there is connected the output terminal of the delay circuit DLY1. That is to say, the delay signal FR1 is input. Also, to the other input terminal of the phase comparator FC there is connected an output terminal of the voltage comparator COMP2. Namely, an output signal FP2 is input. The output terminal of the phase comparator FC is connected to a delay circuit DLY2. Therefore, a compared-result signal CONT that is output from the phase comparator FC is input to the delay circuit DLY2. Regarding the other construction of the DC-DC converter 2, it is the same as that of the DC-DC converter 1, and, therefore, a detailed explanation of that is omitted here.

The construction of the phase comparator FC is illustrated in FIG. 2. The phase comparator FC is equipped with a phase detector 21 and an integration portion 22. The phase detection part 21 is equipped with flip-flops 11 and 12, AND gates AND 1 and 2, and transistors M1 and M2. To a reset input terminal R of the flip-flop FF12 there is input a delay signal FR1, and, to a set input terminal S, an output terminal of the AND gate AND2 is connected. To the AND gate AND2 there are input a signal φP output from the output terminal *Q of the flip-flop FF11 and an output signal FP2. From the output terminal Q of the flip-flop FF12, a signal φR is output. Between a power source voltage Vdd and an earth voltage Vss, there are connected the transistors M1 and M2. To a gate of the transistor M1, there is input the signal φP. To a gate of the transistor M2, there is input the signal φR. The drains of the both transistors are commonly connected to each other, whereby the intermediate is connected to the integration part 22. The integration part 22 is equipped with a resistive element R1 and a capacitor CI. From the integration portion 22, there is output a compared-result signal CONT. Also, regarding the connection relationship of the flip-flop FF11, since it is the same as the flip-flop FF12, a detailed explanation of it is omitted.

The construction of the delay circuit DLY1 will now be explained using FIG. 3. The DLY1 is equipped with a constant-current circuit CG, capacitor C11, voltage comparator COMP11, reference voltage Vref, and transistor M15. To a non-inverted input terminal of the voltage comparator COMP11, there are connected an output terminal of the constant-current circuit CG, a drain terminal of the transistor M15, and one end of the capacitor C11. A source terminal of the transistor M15 is earthed, and a gate terminal is connected to an inverted output terminal *Q2. Also, to an inverted input terminal of the voltage comparator COMP11, there is input the reference voltage Vref. From the voltage comparator COMP11, there is output a delay signal FR1.

The construction of the delay circuit DLY2 will now be explained using FIG. 4. The delay circuit DLY2 is equipped with a retardation time control circuit 31 and a retardation time generating circuit 32. The retardation time control circuit 31 is equipped with a resistive element R11 as well as with transistors M11 to M14. The transistors M11 and M12, and the transistors M13 and M14, respectively, construct current mirror circuits. To the resistive element R11 there is input a compared-result signal CONT. Also, since the retardation time generating circuit 32 has the same construction as that of the delay circuit DLY1 illustrated in FIG. 3, a detailed explanation of it is omitted here.

The operation in a case where the DC-DC converters 1 and 2 are of a fixed on-time duration type will now be explained. Consider now a case where the load is heavy; and the operation of the DC-DC converters are in a stationary state. First, the operation of the DC-DC converter 1 will be explained using a timing chart of FIG. 5. It is to be noted that, although, in FIG. 5, in actuality, there exists a shift of phase between the switching operations of the transistors FET1 and FET2 and the timings at which a voltage-divided value VN1 that is the voltage value of the node N1 changes, for convenience of the explanation, it will be given under the assumption that there be no shift of phase.

The voltage comparator COMP1 of the control part 3 that is equipped to FIG. 1 compares the voltage-divided value VN1 obtained by dividing the output voltage Vout1 of the DC-DC converter 1 and the reference voltage e1, and, when the voltage-divided value VN1 is higher than the reference voltage e1, outputs a low level signal. When the output voltage Vout is lower than the reference voltage e1, the voltage comparator COMP1 outputs a high level signal. When, at a time t10 (FIG. 5) the voltage-divided value VN1 becomes lower than the reference voltage e1, the voltage comparator COMP1 outputs a high-level output signal FP1 to thereby set the flip-flop FF1. When the flip-flop FF1 is set, the transistor FET1 is turned on, whereby an electric current is supplied to the load from the input Vin via the choke coil L1, whereby the output voltage Vout 1 of the DC-DC converter 1 is increased. As a result of this, the voltage-divided value. VN1 also increases (the arrow Y10).

Corresponding to that the flip-flop FF1 is brought to a set state, the output signal SQB1 output from the inverted output terminal *Q1 transits to a low level. When the low-level output signal SQB1 is input to the delay circuit DLY1, after a prescribed period of retardation time DT1 that has been determined by the delay circuit DLY1 has lapsed, a delay signal FR1 that is a high-level pulse signal is output from the delay circuit DLY1 (the zone A1).

Here, the operation of the delay circuit DLY1 will be explained using FIG. 3. The delay circuit DLY1 operates utilizing the amount of electrically charged time of the capacitor C11 via the constant-current circuit CG and the amount of electrically discharged time of the capacitor C11 via the transistor M15, and thereby, after a prescribed period of retardation time has lapsed from the time at which the falling edge of the output signal SQB1 is input, this delay circuit DLY1 outputs a delay signal FR1 that is a high-level pulse signal. When the output signal SQB1 has a high level, the transistor M15 becomes on. And the current i1 of the constant current circuit CG wholly flows into the transistor M15, whereby the non-inverted input terminal of the voltage comparator COMP11 is clamped to the ground potential. Accordingly, the delay signal FR1 output from the voltage comparator COMP11 is brought to a state of low level. When, at the point of time t10, the output signal SQB1 transits from a high level to a low level, since the transistor M15 is turned off, the current i1 of the constant-current circuit CG electrically charges the capacitor C11. Since the voltage of the capacitor C11 goes increased with the current i1 flowing in from the constant-current circuit and the time duration that is determined by the time constant of the capacitor C11, a prescribed amount of time is required until the voltage of the capacitor C11 becomes equal to or higher than the reference voltage Vref. Accordingly, during a period of time in which the voltage of the capacitor C11 is kept lower than the reference voltage Vref, the voltage comparator COMP11 outputs a low-level delay signal FR1. And, when, at a time t11, the voltage of the capacitor C11 has become equal to or higher than the reference voltage Vref, the voltage comparator COMP11 outputs a high-level delay signal FR1 (the zone A1).

And, at a point of time t11, the transistor M15 is turned on correspondingly to the rising edge of the output signal SQB1. Then, the current of the constant-current circuit CG all flows into the transistor M15 and, at the same time, the electric charge of the capacitor C11 is electrically discharged. For this reason, the inversion input of the voltage comparator COMP11 is clamped to the earth potential. At this time, since the on-resistance of the transistor M15 is sufficiently low, the capacitor C11 is instantly electrically discharged. Accordingly, with almost no time delay following, the inversion input of the voltage comparator COMP11 is clamped to the ground potential. Therefore, the delay signal FR1 transits to a low level one. As a result of this, the delay signal FR1 that is the high-level pulse signal is obtained.

As a result of this, it is seen that the delay circuit DLY1, from the time at which the falling edge of the output signal SQB1 is input, after the passage of the retardation period of time DT1 that is determined by the electric current i1 flowing in from the constant-current circuit and the time constant of the capacitor C11, outputs the delay signal FR1 that is the high-level pulse signal.

When the high-level delay signal FR1 is input to the reset input terminal R of the flip-flop FF1, the flip-flop FF1 is brought back to the reset state, whereby the transistor FET1 is turned off and the transistor FET2 is turned on. As a result of this, the energy that has been stored in the choke coil L1 is supplied to the load via the transistor FET2. And, the electric current that flows into the choke coil L1 gradually decreases as the energy is released and the output voltage Vout 1 of the DC-DC converter 1, also, gradually decreases. Therefore, the voltage-divided value VN1 also starts to decrease (the arrow Y11). And, when, at a time t12, the voltage-divided value VN1 becomes lower more than the reference voltage e1, the voltage comparator COMP 1 outputs a high level signal, with the result that the flip-flop FF1 is made to be set again. By the above-described operation being repeatedly performed, the voltage-devided value VN1 is controlled to within a prescribed range RG1.

At this time, among the input Vin, the output voltage Vout 1 of the DC-DC converter 1, the time duration Ton (the time duration in which the transistor FET1 is turned "on"), and the time duration Toff (the time duration in which the transistor FET1 is turned off), the following relational expression is established.

$$Vout1 = Ton/(Ton+Toff) \times Vin \ldots \text{expression} \quad (1)$$

Next, the operation of the DC-DC converter 2 will be explained using a timing chart of FIG. 5. First, a case where the phase of the output signal FP2 is more retarded than the phase of the delay signal FR1 will be explained. For convenience of explanation, an explanation is given of a case where, at a time t11, the phase corresponding to the rising edge of the output signal FP2 (the zone A2) and the phase corresponding to the rising edge of the delay signal FR1 (the zone A1) coincide with each other and, at a time T14, the phase corresponding to the rising edge of the output signal FP2 (the zone A4) is more retarded than the phase corresponding to the rising edge of the delay signal FR1 (the zone A3).

When, at a time t11 in FIG. 5, the voltage-devided value VN2 that is the voltage value of the node N2 becomes lower than the reference voltage e2, the voltage comparator COMP2 outputs a high-level output signal FP2 to set the flip-flop FF2 (the zone A2). When the flip-flop FF2 is set, the transistor FET3 is turned on and an electric current is supplied to the load from the input Vin via the choke coil L2, with the result that the voltage-devided value VN2 increases (the arrow Y13).

Also, correspondingly to the flip-flop FF2 being brought to a set state, the output signal SQB2 output from the inverted output terminal *Q2 transits to a low level signal. When the output signal SQB2 having a low level is input to the delay circuit DLY2, after the passage of a prescribed amount of retardation time DT2 determined by the delay circuit DLY2, the delay signal FR2 that is the high-level pulse signal is output from the delay circuit DLY2 (the zone A5).

When the high-level delay signal FR2 is input to the reset input terminal R of the flip-flop FF2, the flip-flop FF2 is brought back to the reset state, whereby the transistor FET3 is turned off and, on the other hand, the transistor FET4 is turned on. As a result of this, the energy that has been stored in the choke coil L2 is supplied to the load via the transistor FET4. And, the electric current flowing into the choke coil L2 gradually decreases as the energy is released, and the voltage-divided value VN2 also starts to decrease (the arrow Y14). And, at a time t14, the voltage-divided value VN2 becomes lower than the reference voltage e2 and the output signal FP2 is output (the zone A4).

At this time, the period TT2 of the rising edge of the output signal FP2 becomes longer than the period TT1 of the rising edge of the delay signal FR1. Namely, a difference occurs between the DC-DC converters 1 and 2 in terms of the oscillation frequency. As a result of this, it becomes likely that audible noise will occur due to this difference in regard to the frequency, raising a problem. Also, since it is impossible to establish a synchronization between the output signals FP1 and FP2, it is impossible to prevent a simultaneous on/off operation from taking place between the transistors FET1 and FET3. As a result of this, there is the risk of, for example, the input power source ripple voltage's increasing, namely there is the risk that a phenomenon that is unpreferable to the system will take place. This raises a problem. The phase comparator FC that has been equipped for solving the above-described problems will be explained.

The circuit construction of the phase comparator FC is illustrated in FIG. 2. The phase comparator FC, when the input timing of the rising edge of the output signal FP2 is faster than the input timing of the rising edge of the delay signal FR1, determines that this is the advance of phase of the output signal FP2. In this case, it is determined that the period of the rising edge of the output signal FP2 is shorter than the period of the rising edge of the delay signal FR1, correspondingly to the amount of phase advanced. On the other hand, the phase comparator FC, when the input timing of the rising edge of the output signal FP2 is retarded more than the input timing of the rising edge of the delay signal FR1, determines that this is the retardation of phase of the output signal FP2. In this case, it is determined that the period of the rising edge of the output signal FP2 is longer than the period of the rising edge of the delay signal FR1, correspondingly to the amount of phase retarded.

At a time t13, to the AND gate AND1 (FIG. 2), the high-level delay signal FR1 and the high-level signal *φR are input. Therefore, the high-level signal output from the AND gate AND1 is input to the set input terminal S of the flip-flop FF11. Consequently, the flip-flop FF11 is set, whereby the signal φP transits to a low-level signal (the arrow Y16).

Next, at a time t14, the high-level output signal FP2 whose phase is retarded by the period P1 with respect to the delay signal FR1 is input to the reset input terminal R of the flip-flop FF11. Consequently, the flip-flop FF11 is reset, whereby the signal φP transits to a high-level signal (the arrow Y17). As a result of this, through the operation of the flip-flop FF11, the signal φP that is a negative pulse signal and that has the same time duration as that of the period P1 that is the amount of phase retarded of the output signal FP2 from the delay signal FR1 becomes able to be produced. During a time period in which the signal φP is in the state of a low level signal, a PMW signal DO that is output from the phase detection part 21 is made to have a high level. Namely, the phase detection part 21, when the phase of the output signal FP2 is retarded more than the phase of the delay signal FR1, functions as the PWM circuit that outputs a high-level signal the duration of which corresponds to the length of that difference of phase.

The capacitor CI of the integrating part 22 is electrically charged correspondingly to the phenomenon that in the period P1 the high-level PMW signal DO is input. Therefore, the voltage value of the compared-result signal CONT that is an output of the integrating part 22 increases correspondingly to the conduction duration of the transistor M1. As a result of this, in the integrating part 22, there is executed the operation of integrating the PMW signal DO and taking out as the compared-result signal CONT having a voltage proportionate to the PWM signal. The compared-result signal CBNT is input to the delay circuit DLY2 (FIG. 4).

Next, the operation of the delay circuit DLY2 will be explained using FIG. 4. The delay circuit DLY2 is a circuit that, after the passage of a prescribed period of retardation time from the time at which the falling edge of the output signal SQB2 is input, outputs the delay signal FR2 that is a high-level pulse signal. The compared-result signal CONT is input to a retardation-time control circuit 31 of the delay circuit DLY2. To the transistor M11, there flows an electric current i2 proportionate with the compared-result signal CONT. Since the transistors M11 and M12 are a current-mirror circuit, the current i2 also flows to the transistor M12. Since the electric current flowing through the transistor M12 and the electric current flowing through the transistor M13 are the same, the electric current i2 flows through the transistor M13 as well, and since the transistors M13 and M14 are a current mirror circuit, the current i2 flows through the transistor M14 as well. Since the transistor M14 is connected in parallel to the constant-current circuit CG, the electric current that electrically charges the capacitor C11 of the delay circuit becomes a sum total of the current i1 of the constant current circuit CG and the current i2. Accordingly, in proportion to the voltage value of the compared-result signal CONT, the duration in which electricity is charged into the capacitor C11 becomes short. As understood from above, it is seen that when the voltage value of the compared-result signal CONT increases, the amount of retardation time becomes short and when this voltage value decreases, the amount of retardation time becomes long.

As stated before, the voltage value of the compared-result signal CONT is higher, correspondingly to the period P1, at the time t14, than at the time t11. Therefore, the amount of retardation time that is imparted to the delay signal FR2 by the delay circuit DLY2 is shortened from the amount of retardation time DT2 to the amount of retardation time DT2a correspondingly to the increase in the voltage value of the compared-result signal CONT.

When the amount of retardation time decreases from DT2 to DT2a, the time period in which the flip-flop FF2 is set is shortened, with the result that the amount of increase in the output voltage Vout 2 lesses. If such occurs, since the time period that persists until the voltage-divided value VN2 decreases up to the reference voltage e2 shortens, the period of the rising edge of the output signal FP2 becomes short from the period TT2 to TT2a. Namely, if the phase of the output signal FP2 is relatively more retarded when compared with the phase of the delay signal FR1, it is determined that the period TT2 of the output signal FP2 is longer than the period TT1 of the delay signal FR1. As a result of this, there is executed the control of the period's of the output signal FP2 being made short from TT2 to TT2a correspondingly to the amount of phase retarded.

As a result of this, correspondingly to the phase difference between the output signal FP2 and the delay signal FR1, there is executed a feedback control for adjusting the amount of retardation time imparted in the delay circuit DLY2. In consequence, at a time t16 that is after the passage of a prescribed period of time, there is obtained an amount of retardation time DT2b that causes the period TT1 of the delay signal FR1 and the period TT2b of the output signal FP2 to coincide with each other and that makes zero the phase difference between the delay signal FR1 and the output signal FP2.

On the other hand, the operation of the DC-DC converter 2 that occurs in a case where the phase of the output signal FP2 is relatively more advanced than the phase of the delay signal FR1 will be explained using a timing chart of FIG. 6. For convenience of the explanation, an explanation is given of a case where, at a time t21, the phase of the rising edge of the output signal FP2 (the zone A12) and the phase of the rising edge of the delay signal FR1 (the zone A1) coincide with each other and, at a time t23, the phase of the rising edge of the output signal FP2 (the zone A14) is more advanced than the phase of the rising edge of the delay signal FR1 (the zone A3).

When, at a time t21 of FIG. 6, the voltage-divided value VN2 of the DC-DC converter 2 becomes lower than the reference voltage e2, the voltage comparator COMP2 outputs a high-level output signal FP2 to set the flip-flop FF2 (the zone A12). When the flip-flop FF2 is set, the transistor FET3 is turned on, whereby an electric current is supplied to the load from the input Vin via the choke coil L2, whereby the voltage-divided value VN2 rises (the arrow Y23).

Also, correspondingly to the flip-flop FF2 being brought to a set state, the output signal SQB2 output from the inverted output terminal *Q2 transits to a low-level signal. When the low-level output signal SQB2 is input to the delay circuit DLY2, after the passage of a prescribed amount of retardation time DT12 that has been determined by the delay circuit DLY2, the delay signal FR2 that is a high-level pulse signal is output from the delay circuit DLY2 (the zone A15).

When the high-level delay signal FR2 is input to the reset input terminal R of the flip-flop FF2, the flip-flop FF2 is brought back to the reset state, whereby the transistor FET3 becomes turned off and, simultaneously, the transistor FET4 becomes turned on. Then, the energy that has been stored in the choke coil L2 is supplied to the load via the transistor FET4. And, the current flowing into the choke coil L2 gradually decreases with the release of the energy, and the voltage-divided value VN2 also starts to decrease (the arrow Y24). And, at a time t23, the voltage-divided value VN2 becomes lower than the reference voltage e2, whereby the output signal FP2 is output (the zone A14).

At this time, the period TT12 of the rising edge of the output signal FP2 becomes small in comparison with the period TT1 of the rising edge of the delay signal FR1. Therefore, a difference occurs between the DC-DC converters 1 and 2 in terms of the oscillation frequency.

The operation of the phase comparator FC will now be explained. At a time t23, to the AND gate AND 2 (FIG. 2), there are input the high-level output signal FP2 and the high-level signal *φP. Accordingly, the high-level signal output from the AND gate AND 2 is input to the set input terminal S of the flip-flop FF12. If such occurs, the signal φR transits to one having a high level (the arrow Y26).

Next, at a time t24, the high-level delay signal FR1 that is retarded by the period P2 from the output signal FP2 is input to the reset input terminal R of the flip-flop FF12. Therefore, the signal φR transits to one having a low level (the arrow Y27). As a result of this, it becomes possible, through the operation of the flip-flop FF12, to produce a signal φR that is a positive pulse signal the length of time of which is the same as the period P2 that is the amount of phase retarded as measured from the output signal FP2 to the delay signal FR1. During a time period in which the signal φR has a high level, the PMW signal DO output from the phase detection part 21 is kept to have a low level. Namely, the phase detection part 21 functions as a PWM circuit that, when the phase of the output signal FP2 is advanced more than the delay signal FR1, outputs a low level signal that corresponds to the length of that amount of time difference.

The capacitor CI of the integrating part 22 has its electricity discharged correspondingly to the low-level PMW signal DO being input during the amount of time P2. Accordingly, the voltage value of the compared-result signal CONT that is the output of the integrating part 22 decreases correspondingly to the conduction time duration of the transistor M2. The compared-result signal CONT is input to the delay circuit DLY2 (FIG. 4).

Next, the operation of the delay circuit DLY2 will be explained using FIG. 4. As stated previously, correspondingly to that the voltage value of the compared-result signal CONT being made low, the amount of retardation time that is imparted by the delay circuit DLY2 is prolonged. Accordingly, the amount of retardation time that is imparted to the delay signal FR2 by the delay circuit DLY2 is prolonged in the way of from the amount of retardation time DT12 to DT12a. Accordingly, the period of the rising edge of the output signal FP2, also, is prolonged from the period TT12 to TT12a. When the amount of retardation time is increased from DT12 to DT12a, the time duration in which the flip-flop FF2 is in the state of being kept set is prolonged, whereby the amount of increase in the output voltage Vout 2 becomes large. If it occurs, since the time duration that persists until the voltage-divided value VN2 decreases to the reference voltage e2 becomes prolonged, the period of the output signal FP2 becomes long from the period TT12 to TT12a. Namely, when the phase of the output signal FP2 is more advanced than the phase of the delay signal FR1, it is determined that the period TT12 of the output signal FP2 is shorter than the period TT1 of the delay signal FR1, whereby there is executed a control of making the period of the output signal FP2 long from the period TT12 to TT12a correspondingly to the amount of phase advanced.

As a result of this, correspondingly to the phase difference between the output signal FP2 and the delay signal FR1, there is executed a feedback control for adjusting the amount of retardation time that is imparted in the delay circuit DLY2. As a result of this, there is obtained an amount of retardation time DT2b that causes the period TT1 of the delay signal FR1 and the period TT2b of the output signal FP2 to coincide with each other and that makes zero the phase difference between the delay signal FR1 and the output signal FP2.

As explained above in detail, in the DC-DC converter equipped with the control part 3 according to this embodiment, there is executed a feedback control for adjusting the period of the output signal FP2 correspondingly to the phase difference between the output signal FP2 and the delay signal FR1, with the result that it becomes possible to perform a control of causing the oscillation frequency of the comparator control type DC-DC converter 2 to coincide with the oscillation frequency of the DC-DC converter 1. Accordingly, it becomes possible to prevent audible noise from occurring due to the difference between the switching frequencies.

Also, as a result of that, it becomes possible to establish a synchronization between the off-timing of the transistor FET1 of the DC-DC converter 1 and the on-timing of the transistor FET3 of the DC-DC converter 2. Accordingly, it is possible to prevent the occurrence of a simultaneous on/off phenomenon between the main switching transistor, whereby it is possible to prevent the increase in the input power source ripple voltage.

Incidentally, the present invention is not limited to the above-described embodiment and of course permits various changes and modifications to be made without departing from the subject matter of the invention. In this embodiment, although an explanation has been given of the fixed on-time duration type comparator control type DC-DC converter, the invention is not limited to that mode of embodiment. It is of course possible to apply the present invention to the fixed off-time duration type comparator control type DC-DC converter as well. An applied circuit example is illustrated in FIG. 7. The construction of the DC-DC converter 1a will now be explained. To the non-inverted input terminal of the voltage comparator COMP1, there is connected the node N1 while, on the other hand, to the inverted input terminal thereof, there is connected the reference voltage e1. The output signal FP1 of the voltage comparator COMP1 is input to the reset input terminal R of the flip-flop FF1. Also, the non-inverted output terminal Q1 is connected to the output terminal DH1 and simultaneously the terminal Q1 is connected to the set input terminal S of the flip-flop FF1 via the delay circuit DLY1a.

Also, the construction of the DC-DC converter 2a will now be explained. The DC-DC converter 2a is equipped with the phase comparator FC. The compared-result signal CONT that is output from the phase comparator FC is input to the delay circuit DLY2a. Incidentally, regarding the other construction, since it is the same as the DC-DC converters 1, 2 illustrated in FIG. 1, a detailed description of it is omitted here.

When the voltage-divided value VN1 of the DC-DC converter 1a becomes higher than the reference voltage e1, the voltage comparator COMP1 outputs a high-level output signal FP1 to thereby reset the flip-flop FF1. When the flip-flop FF1 is reset, the transistor FET1 is brought to an off state, whereby the energy stored in the choke coil L1 is supplied to the load via the transistor FET2. And, the electric current that flows through the choke coil L1 gradually decreases with the release of the energy, and the output voltage Vout1 of the DC-DC converter 1, also, gradually decreases. As a result of this, the voltage-divided value VN1 also starts to decrease. Also, by the flip-flop FF1 being reset, the output signal SQB1a transits from a high level to a low level. The delay circuit DLY1a, after the passage of a prescribed amount of time that occurs from the inputting of the falling edge of the output signal SQB1, outputs the delay signal FR1 that is the high-level pulse signal. Therefore, the flip-flop FF1 is brought to a set state by the delay signal FR1. If it occurs, the voltage-divided value VN1 of the DC-DC converter 1a becomes increases again, whereby when thereafter its level becomes higher than the level of the reference voltage e1 the voltage comparator COMP1 outputs an output signal FP1 whose level is high and thereby resets the flip-flop FF1. By this operation being repeated, the fixed off-time duration type DC-DC converter is constructed.

And, in the delay circuit DLY2a, there is executed a feedback control for adjusting the amount of retardation time in correspondence with the phase difference between the output signal FP2 and the delay signal FR1. As a result of this, it becomes possible to cause the period of the delay signal FR1 and that of the output signal FP2 to coincide with each other. Also, it becomes possible to obtain a synchronization between the on-timing of the transistor FET1 of the DC-DC converter 1a and the off-timing of the transistor FET3 of the DC-DC converter 2a.

Although in this embodiment an explanation has been given of the case where the switching timings of the DC-DC converters 1 and 2 are synchronized with each other, the DC-DC converters that are synchronized with each other are not limited to two in number. Even if the DC-DC converters are three or more in number, synchronization can be established among them. The operation that is performed in a case where there are more than one fixed on-time duration type DC-DC converters that stand on the comparator control will be explained using FIG. 8. A control part 13b is used commonly to the DC-DC converters 1b to 3b. The DC-DC converter 2b is equipped with a phase comparator FC2. To one input terminal of the phase comparator FC2, there is input the delay signal FR1 output from the delay circuit DLY1. Also, to the other input terminal of the phase comparator FC2, there is input the output signal FP2 output from the voltage comparator COMP2. The compared-result signal CONT2 that is output from the phase comparator FC2 is input to the delay circuit DLY2. Similarly, the DC-DC converter 3b is equipped with a phase comparator FC3. To the phase comparator FC3, there are input the delay signal FR2 output from the delay circuit DLY2 and the output signal FP3 output from the voltage comparator COMP3. The compared-result signal CONT3 output from the phase comparator FC3 is input to the delay circuit DLY3. And, as stated previously, in the delay circuit DLY2, the amount of retardation time is adjusted correspondingly to the phase difference between the output signal FP2 and the delay signal FR1, whereas, in the delay circuit DLY3, the amount of retardation time is adjusted correspondingly to the phase difference between the output signal FP3 and the delay signal FR2.

By doing so, it is possible to synchronize the on-timing of the transistor FET3 of the DC-DC converter 2b with the off-timing of the transistor FET1 of the DC-DC converter 1b. And, further, the on-timing of the transistor FET5 of the DC-DC converter 3b can be synchronized with the off-timing of the transistor FET3 of the DC-DC converter 2b.

As a result of this, in a case where constructing a multi-phase converter equipped with a plurality of DC-DC converters, it becomes possible to synchronize the on-timing of the main switching transistor of an (n)th (the n represents a natural number of 2 or more) DC-DC converter with the off-timing of the main switching transistor of the (n−1)th DC-DC converter. Accordingly, when executing the switching control for three or more main switching transistors, it is possible to prevent all of the main switching transistors from simultaneously being turned on/off. And, therefore, it is possible to prevent the increase in the input power source ripple voltage. In addition, since it is possible to establish a coincidence between each two of the DC-DC converters 1b to 3b in terms of the oscillation frequencies, it becomes possible to prevent the generation of audible noise due to the differences between the switching frequencies.

Also, in this embodiment, the delay signal FR1 that is the control signal for the transistor FET1 of the DC-DC converter 1 has been used as the signal that serves as a reference for the oscillation frequency of the DC-DC converter 2. However, the invention is not limited thereto. It is needless to say that as a timing signal that becomes a reference for the operating frequency of the DC-DC converter 2 there may be used a signal that is output from another appliance. A case where using an oscillator OSC in place of the DC-DC converter 1 is illustrated in FIG. 9. To the phase comparator FC, there is input, in place of the delay signal FR1, a clock signal CLK output from the oscillator OSC. The phase comparator FC outputs the compared-result signal CONT that corresponds the phase difference between the clock signal CLK and the output signal FP2. The delay circuit DLY2 performs a feedback control for adjusting the amount of retardation time in correspondence with the compared-result signal CONT. As a result of this, the switching frequency of the comparator-controlled fixed on-time duration type DC-DC converter 2 can be synchronized with the frequency of the oscillator OSC.

As a result of this, it becomes possible, while keeping alive the merit of the comparator-controlled PFM type DC-DC converter 2 that enables making a high-speed response to a rapid change in the load, to control the oscillating frequency of the DC-DC converter 2 to a desired frequency through the operation of the oscillator OSC. Namely, it is possible to prevent the oscillation frequency of the DC-DC converter 2 from fluctuating depending on the time constant of the circuit and the level of the load.

Also, in the delay circuit DLY2 (FIG. 4) of this embodiment, a voltage comparator COMP11 is used at a stage from which a relevant signal is output, but, the invention is not limited thereto. A driver circuit may be used instead of the voltage comparator COMP11. When the output signal SQB1 is in a state of a high level, the ground potential is input to the driver circuit. Therefore, from the voltage comparator COMP11, there is output the low-level delay signal FR2. And, when, after the passage of a prescribed amount of time from the falling edge of the output signal SQB1, the voltage of the capacitor C11 has become higher than the threshold-value voltage of the driver circuit, the high-level delay signal FR1 is output. By this, it is possible to perform the operation of, despite the fact that the circuit is simplified, enabling the outputting of the delay signal FR2 after the passage of a prescribed amount of retardation time determined through the operation of the delay circuit DLY2.

Also, in this embodiment, the voltage-drop type DC-DC converter has been explained. Here, the point of the present invention characteristically is to obtain a synchronization in terms of switching timing between the main switching transistor of the DC-DC converter 1 and the synchronous-commutation transistor of the DC-DC converter 2. Accordingly, needless to say, the present invention can be applied in a boost type DC-DC converter as well.

Incidentally, the reference voltage e2 is one example of the first reference voltage; the reference voltage Vref is one example of the second reference voltage; the voltage comparator COMP2 is one example of the first comparator; the voltage comparator COMP11 is one example of the second comparator; the delay signal FR1 and clock signal CLK each are one example of the phase reference signal; the output signal FP2 is one example of the detection signal; the output signal SQB2 is one example of the transition signal; the earth voltage is one example of the first voltage; the power source voltage is one example of the second voltage; the transistor M2 is one example of the first switch; the transistor M1 is one example of the second switch; and the transistor M15 is one example of the third switch.

According to the control circuit and control method of the comparator control type DC-DC converter according to the present invention, it becomes possible to prevent the generation of audible noise due to the difference between the switching frequencies and also to prevent the increase in the input power source ripple voltage due to the simultaneous on/off phenomenon between the main switching transistors.

What is claimed is:

1. A DC-DC converter control circuit comprising:
   a first comparator that compares an output voltage and a first reference voltage and that detects a case where the output voltage crosses the first reference voltage to output a detection signal;
   a flip-flop that controls a main switching transistor and that according to the output signal transits from a first state to a second state;
   a phase comparator that detects the phase difference between a phase reference signal input from outside and the detection signal and outputs a phase difference signal corresponding to the phase difference; and,
   a delay circuit that is connected between an output and input of the flip-flop circuit and to which there is input the phase difference signal,
   whereby the delay circuit, in a case where the phase of the detection signal is more advanced than the phase of the phase reference signal, after having imparted an amount of retardation time that has been increased correspondingly to the amount of phase advanced to a transition signal input from the flip-flop at the time of the flip-flop's transiting from the first state to the second state, outputs the transition signal to which the amount of the retardation time is imparted, to the flip-flop; and the delay circuit, in a case where the phase of the detection signal is more retarded than the phase of the phase reference signal, after having imparted the amount of retardation time decreased correspondingly to the amount of phase retarded to the transition signal, outputs the transition signal to which the amount of the retardation time is imparted, to the flip-flop,
   whereby the flip-flop, correspondingly to that the transition signal to which the amount of retardation time has been imparted is input, transits from the second state to the first state.

2. A DC-DC converter control circuit according to claim 1, wherein
   the phase reference signal is a signal that causes a main switching transistor equipped to another DC-DC converter to transit to a non-conductive state, whereby
   when the flip-flop is in the first state, the main switching transistor is made non-conductive, whereas
   when the flip-flop is in the second state, the main switching transistor is made conductive.

3. A DC-DC converter control circuit according to claim 1, wherein
   the phase reference signal is a signal that causes a main switching transistor equipped to another DC-DC converter to transit to a conductive state, whereby
   when the flip-flop is in the first state, the main switching transistor is made conductive, whereas
   when the flip-flop is in the second state, the main switching transistor is made non-conductive.

4. A DC-DC converter control circuit according to claim 1, wherein it comprises, as the phase reference signal, an oscillator that outputs a clock signal.

5. A DC-DC converter control circuit according to claim 1, wherein
   the phase comparator comprises
   an integrator;
   a first switch that connects the integrator and a first voltage; and
   a second switch that connects the integrator and a second voltage,
   whereby
   when the phase of the detection signal is more advanced than the phase of the phase reference signal, the circuit brings the first switch to a conductive state in correspondence with the phase difference, whereas
   when the phase of the comparison frequency signal is more retarded than the phase of the reference frequency signal, the circuit brings the second switch to a conductive state in correspondence with the phase difference.

6. A DC-DC converter control circuit according to claim 1, wherein
   the delay circuit comprises
   an electric current source that causes a change in the amount of current in correspondence with the phase difference signal;
   a capacitor that is connected in series to the current source and one end of which is grounded;
   a third switch that, corresponding to that the flip-flop is made to transit from the first state to the second state, is made conductive and that, corresponding to that the flip-flop is made to transit from the second state to the first state, is made non-conductive, and that is connected in parallel to the capacitor; and
   a second comparator that outputs to the flip-flop the compared result obtained by comparing the voltage of the capacitor and a second reference voltage.

7. A DC-DC converter control method comprising:
   a step that compares an output voltage and a first reference voltage and that detects a case where the output voltage crosses the first reference voltage to output a detection signal;
   a step that, in correspondence with the detection signal, causes a main switching transistor to transit from a first state to a second state; and
   a step of, in a case where the phase of the detection signal is more advanced than the phase of a phase reference signal, when an amount of retardation time that has been increased correspondingly to the amount of phase advanced from a time when the main switching transistor transits from the first state to the second state has lapsed, causing the main switching transistor to transit from the second state to the first state, whereas, in a case where the phase of the detection signal is more retarded than the phase of the phase reference signal, when the amount of retardation time that has been decreased correspondingly to the amount of phase advanced from a time when the main switching transistor transits from the first state to the second state has lapsed, causing the main switching transistor to transit from the second state to the first state.

* * * * *